(12) United States Patent
Lestriez et al.

(10) Patent No.: US 9,263,728 B2
(45) Date of Patent: Feb. 16, 2016

(54) ELECTRODE COMPOSITE

(75) Inventors: Bernard Lestriez, Nantes (FR);
Dominique Guyomard, Sautron (FR);
Joël Gaubicher, Nantes (FR)

(73) Assignee: Centre National De La Recherche Scientifique, Paris (FR)

( * ) Notice: Subject to any disclaimer, the term of this patent is extended or adjusted under 35 U.S.C. 154(b) by 1052 days.

(21) Appl. No.: 13/262,948

(22) PCT Filed: Apr. 6, 2010

(86) PCT No.: PCT/FR2010/050654
§ 371 (c)(1),
(2), (4) Date: Jan. 4, 2012

(87) PCT Pub. No.: WO2010/116083
PCT Pub. Date: Oct. 14, 2010

(65) Prior Publication Data
US 2012/0132859 A1    May 31, 2012

(30) Foreign Application Priority Data
Apr. 6, 2009   (FR) .................................... 09 01664

(51) Int. Cl.
*H01M 4/04* (2006.01)
*H01M 4/131* (2010.01)
*H01M 4/136* (2010.01)
(Continued)

(52) U.S. Cl.
CPC ............ *H01M 4/0416* (2013.01); *H01M 4/049* (2013.01); *H01M 4/131* (2013.01); *H01M 4/136* (2013.01); *H01M 4/1391* (2013.01); *H01M 4/1397* (2013.01); *H01M 4/625* (2013.01); *H01M 4/661* (2013.01); *H01M 4/483* (2013.01); *H01M 4/5825* (2013.01); *H01M 10/0525* (2013.01); *Y02E 60/122* (2013.01)

(58) Field of Classification Search
CPC ...................................................... H01M 4/049
USPC ............... 252/503, 507; 429/207, 213, 231.1, 429/231.95, 212
See application file for complete search history.

(56) References Cited

U.S. PATENT DOCUMENTS 5,571,638 A * 11/1996 Satoh et al. .................... 429/248
6,423,446 B1 * 7/2002 Miyazaki et al. .............. 429/209
(Continued)

FOREIGN PATENT DOCUMENTS

| JP | 11-214004 | * 8/1999 |
| JP | 2009037842 | 2/2009 |
| WO | 2005090486 | 9/2005 |

OTHER PUBLICATIONS

JP 11-214004 MT.*
(Continued)

*Primary Examiner* — Patrick Ryan
*Assistant Examiner* — Alex Usyatinsky
(74) *Attorney, Agent, or Firm* — Sofer & Haroun, LLP

(57) ABSTRACT

A composite electrode includes a mixture of active matter (AM) particles and EC material particles generating an electronic conductivity, the mixture being supported by an electrical lead forming a DC current collector. The electrode can be manufactured by a method which consists of modifying the AM particles and the EC particles so as to react with each other and with the material of the collector in order to form covalent and electrostatic bonds between said particles, as well as between the particles and the current collector, and then placing the different constituents in contact.

16 Claims, 2 Drawing Sheets

(51) Int. Cl.
*H01M 4/1391* (2010.01)
*H01M 4/1397* (2010.01)
*H01M 4/62* (2006.01)
*H01M 4/66* (2006.01)
H01M 4/48 (2010.01)
H01M 4/58 (2010.01)
H01M 10/0525 (2010.01)

(56) References Cited

U.S. PATENT DOCUMENTS

2004/0071624 A1* 4/2004 Tour et al. .................. 423/447.1
2005/0244644 A1* 11/2005 Hampden-Smith et al. .. 428/408
2008/0062616 A1 3/2008 Matsuda et al.
2009/0029221 A1* 1/2009 Goddard et al. ................ 429/30
2009/0087709 A1* 4/2009 Zaghib et al. ................... 429/27
2009/0305132 A1* 12/2009 Gauthier et al. .............. 429/207
2010/0119949 A1 5/2010 Yano et al.

OTHER PUBLICATIONS

Doppelt et al. Chem. Mater. 2007, 19, 4570-4575.*
Li et al J. Am. Chem. Soc. 2005, 127, 14518-14524.*
International Search Report dated Jul. 28, 2010.

* cited by examiner

ELECTRODE COMPOSITE

RELATED APPLICATIONS

This application is a National Phase application of PCT/FR2010/050654, filed on Apr. 6, 2010, which in turn claims the benefit of priority from French Patent Application No. 09 01664 filed on Apr. 6, 2009, the entirety of which are incorporated herein by reference.

BACKGROUND

1. Field of the Invention

The present invention relates to electrodes consisting of a current collector which bears a composite material comprising particles of active material and particles of an electronic conductor material.

2. Description of Related Art

It is known to use, in electrochemical generators, especially rechargeable lithium batteries, electrodes consisting of a composite material deposited on a current collector, said composite material consisting of an active material and of a material generating an electronic conduction. The active material is used in the form of particles, and it may be, for example, a transition metal oxide of spinel structure, a transition metal oxide of lamellar structure; an oxide of polyanionic framework or a vanadium-based oxide. Conventional examples are the oxides of formula $LiMPO_4$ in which M represents at least one element chosen from Mn, Fe, Co and Ni, in particular $LiFePO_4$. The material generating an electronic conductivity is generally carbon, in the form of carbon black powder, graphite powder, carbon fibers or carbon nanofibers.

OBJECTS AND SUMMARY

The objective of the present invention is to improve the performances of these electrodes, by improving the contact, on the one hand, between the particles and, on the other hand, between the particles and the current collector.

Consequently, the subject of the present invention is a process for preparing a composite electrode comprising a mixture of particles of active material AM and particles of an EC material generating an electronic conductivity, said mixture being supported by an electrical conductor forming a current collector CC. Said process is characterized in that it consists in modifying the AM particles and the EC particles so that they can react with one another and with the material of the collector in order to form covalent bonds, and so as to form electrostatic bonds on the one hand between said particles and on the other hand between said particles and the current collector.

The process of the present invention may be carried out in order to produce an electrode in which:
- the active material is chosen from the compounds described in the prior art as an electrode active material, in particular oxides (especially lithium titanates and oxides which derive therefrom by partial replacement of Li or of Ti), phosphates (especially lithium phosphates and phosphates of at least one transition metal preferably chosen from Fe, Mn and Co) and borates (especially Li borates and borates of at least one transition metal preferably chosen from Fe, Mn and Co);
- the EC material generating an electronic conductivity is a carbon black, a graphite, a carbon nanotube or carbon fiber, or a mixture thereof;
- the current collector is a metallic material, for example a stainless steel or a metal chosen from aluminum, stainless steel, copper, nickel, it being possible for said metallic material to optionally be modified by a layer of carbon, of transition metal nitride or of conductive polymer. The collector may be in the form of a non-porous plate or of a porous plate. A porous plate may be in the form of a grid or of several interwoven grids.

In one particular embodiment, the AM particles, the EC particles and the current collector (globally donated hereinbelow by the term "substrates") are modified using reactants (denoted hereinbelow generally by T-X-L) which enable the formation of a covalent bond on the one hand between the particles and on the other hand between the particles and the current collector, and using reactants, denoted generally by T-X-Q, which make it possible to control the charge.

In the T-X-L and T-X-Q reactants:
- a T group is a functional group capable of reacting with one of the AM, EC or CC elements in order to form a covalent bond;
- an X group is a conjugated spacer group, that is to say a group which comprises a system of atoms bonded by a covalent bond with at least one delocalized π bond;
- an L group is a functional group capable of reacting with another L functional group in order to form a covalent bond; and
- a Q group is a charged group, which may optionally be formed in situ.

The X spacer group may be, for example, a divalent group consisting of at least one group chosen from phenylene, oligophenylene, oligophenylenevinylene, oligophenyleneethynylene, oligothiophene and azobenzene groups.

The T group of a T-X-L or T-X-Q reactant depends on the chemical nature of the substrate which must be modified.

T may be a $PO_3H_2$, COOH or $SO_3H$ group when the substrate to be modified is an oxide, a phosphate or a borate that are conventionally used as active material AM. In this case, the reaction may be carried out in a mixture of methanol and toluene (1/1) and it is completed in less than one hour.

T may be a diazonium cation, when the substrate to be modified is carbon forming the EC material, or an active material AM in the form of particles that are at least partially coated with carbon, or a metallic material (for example a stainless steel, Cu or Ni) forming the current collector. The counterion may be, for example, a $BF_4^-$ or $Cl^-$ anion. A T-X-L or T-X-Q reactant in which T is a diazonium cation may be produced in situ from an $NH_2$—X-L or $NH_2$—X-Q compound in acetonitrile ACN by addition of tBu-$NO_2$, or in a medium at pH≤1 by addition of $NaNO_2$. The reaction of a substrate with a reactant in which T is a diazonium cation is advantageously carried out via an electrochemical route in a three-electrode cell at a potential of less than 0 V vs. SCE in which the electrolyte is a 0.1M deaerated $NBu_4BF_4$ solution in ACN or in water at pH≤2, said solution also containing 0.1 mM of diazonium salt. In order to modify a current collector made of stainless steel or made of aluminum using a reactant having a diazonium group, the electrochemical route is essential.

The L functional groups are groups capable of reacting with one another in order to form a covalent bond. When the AM material, the EC material and the current collector CC have been modified by reaction with the T groups of T-X-L reactants, the reaction between the various L groups makes it possible to bond AM particles with one another, EC particles with one another, AM particles with EC particles, and also AM or EC particles with the current collector CC.

As a first example of a pair of L functional groups, mention may be made of an azido group and an acetylene group which allow the Huisgen reaction according to one of the following reaction schemes:

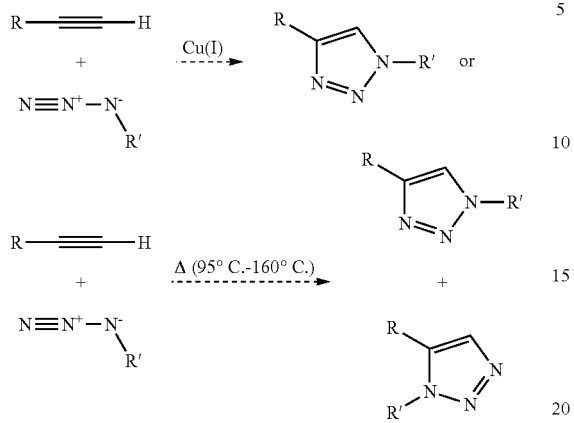

In this scheme, R represents sub1-X1-L1 and R' represents sub2-X2-L2, sub1 and sub2 each representing one of the AM, EC or CC substrates, after modification by reaction respectively with the T1-X1-L2 and T2-X2-L2 reactants, T1 and T2, X1 and X2, L1 and L2 respectively being one of the T, X and L groups defined above. Only one of the substrates sub1 and sub2 may be the current collector.

The reaction may be carried out either in the presence of a Cu(I) compound as catalyst, or by simple heating at a temperature between 95 and 160° C.

The Huisgen reaction consequently makes it possible to bond, via covalent bonding, an AM, EC or CC element modified by grafting of an azido group with an identical or different element modified by grafting of an acetylene group.

As a second example of a pair of L functional groups, mention may be made of an $NH_2$ group and a COOH group which react together to form an amide group, according to the following reaction scheme:

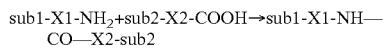

A Q group is a charged group, which may optionally be formed in situ. For example, a Q group may be a negatively-charged group $COO^-$, a $HPO_3^-$ group, a $PO_3^{2-}$ or an $SO_3^-$ group, said negatively-charged groups being formed in water from a modified substrate, respectively sub-X—COOH, sub-X—$PO_3H_2$ and sub-X—$SO_3H$. A Q group may also be a positively-charged group $NH_3^+$, said positively-charged group being formed in water from a modified substrate sub-X—$NH_2$.

It should be noted that certain chemical functions may act as T group, L group or Q group, depending on the substrate (AM, EC or CC) with which they are associated. Therefore, certain reactant molecules may act as both a "modifier of surface charge" of an element and as a bonding element between particles. Some examples of reactants are given below, by way of illustration.

A compound corresponding to the formula

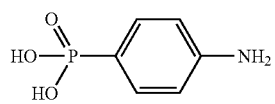

may be used:
  as TXL reactant for modifying an active material AM of oxide, phosphate or borate type, using a phosphorus-containing group (T group), it then being possible for the $NH_2$ group to be used for an amidation reaction in view of bonding the AM particles with other particles bearing COOH groups;
  as TXQ reactant for modifying an active material AM of oxide, phosphate or borate type, using a phosphorus-containing group (T group), the $NH_2$ group being a precursor group of a charged $NH_3^+$ group.

A compound corresponding to one of the formulae

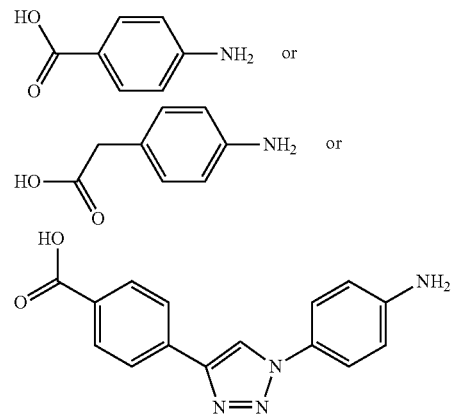

may be used:
  as TXL reactant for modifying an active material AM of oxide, phosphate or borate type, using a COOH group (T group), it then being possible for the $NH_2$ group to be used for an amidation reaction in view of bonding the AM particles with other particles bearing COOH groups;
  as TXQ reactant for modifying an active material AM of oxide, phosphate or borate type, using a COOH group (T group), the $NH_2$ group being a precursor group of a charged $NH_3^+$ group;
  as TXL reactant for modifying a carbon substrate, a substrate comprising a carbon coating or a metallic substrate using the diazonium group (T group) obtained in situ from the $NH_2$ group, the COOH group (L group) then making it possible to bond the modified substrate to another substrate bearing amine groups.

A compound corresponding to the formula

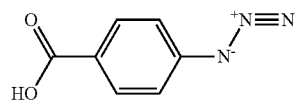

may be used as TXL reactant for modifying an oxide, a phosphate or a borate using the COOH group (T group), the $N_3$ azido group then acting as L group enabling a Huisgen reaction with a modified substrate bearing an acetylene group.

A compound corresponding to the formula

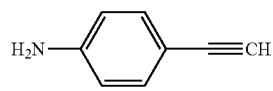

may be used as TXL reactant for modifying a carbon substrate, a substrate comprising a carbon coating or a metallic substrate using the diazonium group (T group) obtained in situ from the NH$_2$ group, the —C≡CH group (L group) then making it possible to bond the modified substrate to another substrate bearing azido groups via the Huisgen reaction.

A compound corresponding to the formula

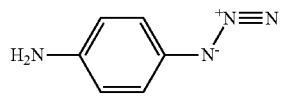

may be used as TXL reactant for modifying a carbon substrate, a substrate comprising a carbon coating or a metallic substrate using the diazonium group (T group) obtained in situ from the NH$_2$ group, the N$_3$ azido group (L group) then making it possible to bond the modified substrate to another substrate bearing acetylene groups via the Huisgen reaction.

A compound corresponding to the formula

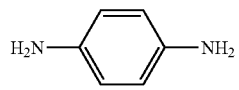

may be used as TXL reactant for modifying a carbon substrate, a substrate comprising a carbon coating or a metallic substrate using the diazonium group (T group) obtained in situ from one of the two NH$_2$ groups, it then being possible for the NH$_2$ group to be used for an amidation reaction in view of bonding the particles with other particles bearing COOH groups;

may be used as TXQ reactant for modifying a carbon substrate, a substrate comprising a carbon coating or a metallic substrate using the diazonium group (T group) obtained in situ from one of the two NH$_2$ groups. The remaining NH$_2$ group being a precursor group of a charged NH$_3^+$ group (Q group), and it makes it possible to modify the surface charge.

More specifically, the process for preparing an electrode according to the invention comprises the following steps:

a) modifying the AM particles using at least one T1-X1-L1 reactant and a T1'-X1'-Q1 reactant;
b) modifying the EC particles using at least one T2-X2-L2 reactant and a T2'-X2'-Q2 reactant;
c) modifying the current collector using T3-X3-L3 and T3'-X3'-Q3 reactants;
d) mixing the modified AM particles and the modified EC particles and bringing into contact with the modified current collector;
e) applying conditions that make the reaction between the various L groups possible;

it being understood that the L1, L2 and L3 groups are chosen so as to be able to react with one another.

During step c) that aims to modify the current collector, the two faces of the conductive substrate forming the current collector are modified in order to produce a double-sided electrode. In order to produce a single-sided electrode, either one of the faces of the substrate is protected during the modification, or the two faces are modified and the surface layer of one of the modified faces is removed, for example by abrasion.

In order to bond particles of one and the same substrate together, said must bear two different L groups capable of reacting with one another. In order to bond together AM particles and EC particles, the AM particles must bear L1 groups capable of reacting with L2 groups of the EC particles.

Similarly, in order to bond AM particles or EC particles to the collector, the collector must bear L3 groups capable of reacting respectively with L2 groups or L3 groups. When particles have been modified by two TXL reactants bearing different L groups (one enabling a Huisgen reaction and the other an amidation reaction), the bonding between the particles may take place via both routes, simultaneously or not.

The order in which steps a), b) and c) are carried out is not important.

Step e) may be carried out in one or more steps, before or after bringing the mixture of modified AM particles and of modified EC particles into contact with the current collector.

In a first particular embodiment, referred to as a "self-assembly process", the process may be carried out by introducing into a liquid support medium the current collector modified according to step c), the AM particles modified according to step a), the EC particles modified according to step b), then by applying the conditions required for the reaction between the various L1, L2 and L3 groups. Applying the required conditions may include adding suitable reactants (especially a catalyst) or a simple heating, depending on the reactivity of the L1, L2 or L3 groups.

In a second embodiment, a mixture of modified AM particles and of modified EC particles is prepared, a modified current collector is prepared, the mixture of modified particles is deposited on the modified current collector, then, as in the first procedure, the conditions required for the reaction between the various L1, L2 and L3 groups are applied.

In a third embodiment:
a modified current collector is prepared that bears L3 groups;
modified AM particles are prepared that bear an L1 group;
modified EC particles are prepared that bear L2 and L2' groups capable of reacting with one another and one of which can react with L1;
the modified particles are mixed and the conditions required for the reaction between the various L1, L2 and L2' groups are applied, which enables the AM and EC particles to self-assemble;
the material resulting from the reaction between the various L1, L2 and L2' groups is deposited on the modified current collector and the conditions that enable the reaction of the L3 groups with the L1, L2 and L2' groups that have remained free are applied.

The present invention is illustrated by the following example, to which it is not however limited.

BRIEF DESCRIPTION OF THE DRAWINGS

The present invention can be best understood through the following description and accompanying drawings, wherein.

DETAILED DESCRIPTION

Example

A composite electrode comprising titanium oxide as active material AM, a mixture of carbon fiber and carbon nanotubes as EC material and a stainless steel current collector was prepared according to the third embodiment described above.

AM consists of particles of anatase $TiO_2$ ($\Phi \approx 20$ nm).

EC consists of a mixture of carbon nanotubes and carbon fibers in weight proportions of 1 to 1.

Preparation of Modified EC Particles

Added to 25 ml of ultrapure water and 5 ml HCl (35%) were 40 mg of EC particles, then 50 mg of 4-aminophenylacetic acid and 25 mg of $NaNO_2$, and they were reacted at 4° C. with ultrasonic waves for 4 h. After filtration and 3 washing operations with ultrasonic waves using ultrapure water then alcohol, particles of carbon bearing chemisorbed -Ph-$CH_2$—COOH groups were obtained.

Preparation of Modified AM Particles 50 mg of $TiO_2$ particles were dispersed in a 1/1 methanol/toluene mixture, then 3.5 g of 4-aminophenyl acid were added. After 30 minutes, the material was centrifuged and washed 3 times with ethanol and particles of $TiO_2$ bearing chemisorbed COO—$CH_2$-Ph-$NH_2$ groups were obtained, the COO group complexing the $TiO_2$ surface.

Figure 1:
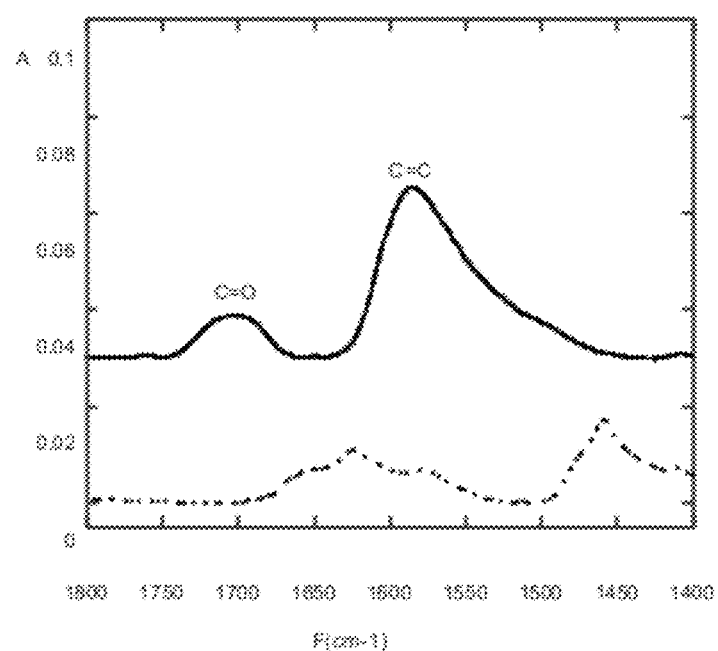
FIG. 1 is a chart showing the spectrum corresponding to the modified EC particles, in accordance with one embodiment.
Figure 2:
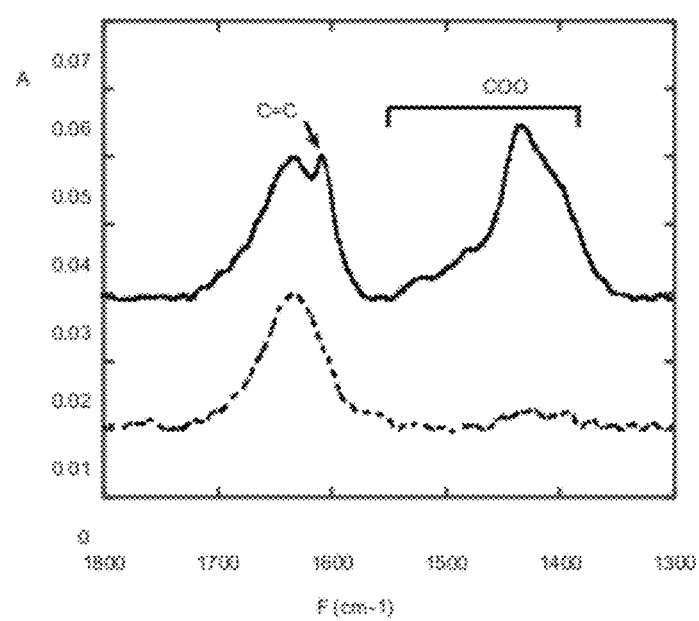
FIG. 2 is a chart showing the modified TiO$_2$ particles in accordance with one embodiment.

The modified EC particles and the modified AM particles were analyzed by Fourier transform infrared spectroscopy. The spectrum corresponding to the modified EC particles is represented in FIG. 1, and that which corresponds to the modified $TiO_2$ particles is represented in FIG. 2. In both figures, A on the y-axis represents the absorbance and F on the x-axis represents the frequency. In FIG. 1, the dotted-line curve corresponds to EC before modification and the solid-line curve corresponds to EC after grafting. C=O denotes the lines of the C=O groups of COOH, and C=C denotes the lines of the C=C group of the phenyl group. In FIG. 2, the dotted-line curve corresponds to $TiO_2$ before modification and the solid-line curve corresponds to $TiO_2$ after grafting. COO denotes the lines of the chemisorbed groups, and C=C denotes the lines of the C=C group of the phenyl group.

These spectra show that 4-aminophenylacetic acid is indeed grafted to the EC and $TiO_2$ particles.

Preparation of the Electrode Composite Material

A 50/50 mixture by weight of modified AM particles and or modified EC particles was prepared, this mixture was introduced into ultrapure water and was left under magnetic stirring for 30 minutes. Next, 5 times the stoichiometric amount of 4-(4,6-dimethoxy-1,3,5-triazin-2-yl)-4-methylmorpholinium chloride (DMTMM) was added which dissolved instantaneously, it was left to react for 15 hours, then the solid, gray-colored and homogeneous material was recovered by centrifugation and was rinsed 5 times with ultrapure water in order to remove any trace of DMTMM.

Figure 3:
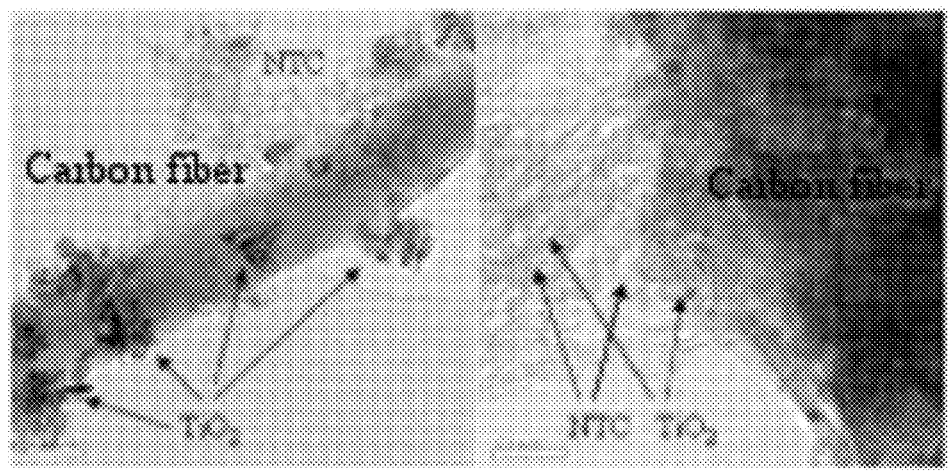
FIG. 3 are the images obtained by transmission electron microscopy (TEM) for the material of Example 1, in accordance with one embodiment.

The material thus obtained was analyzed by transmission electron microscopy (TEM). The TEM images obtained are represented in FIG. 3. FIG. 3 shows that the $TiO_2$ particles are in intimate contact both with the carbon fibers and with the carbon nanotubes, which proves that it is possible to self-assemble EC and AM.

Figure 4:
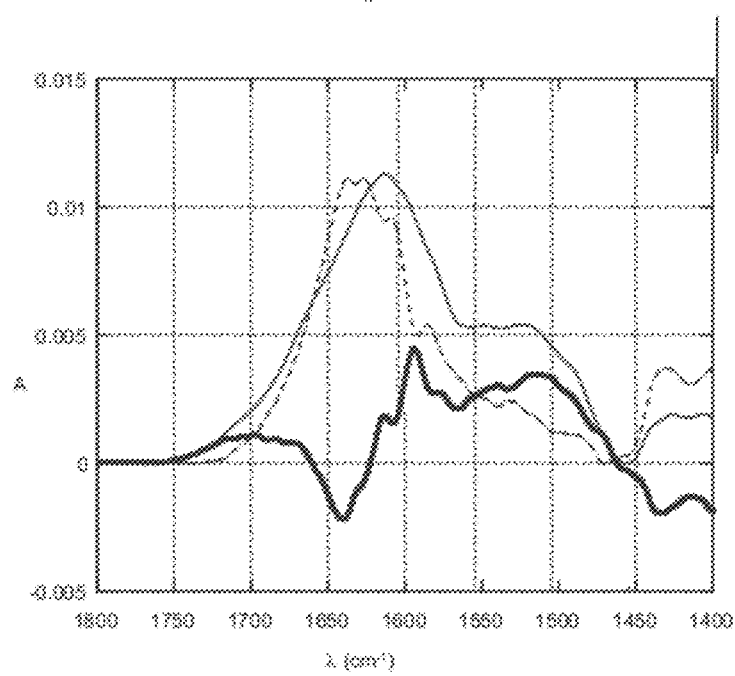
FIG. 4 is an infrared spectrum of the composite material of Example 1, in accordance with one embodiment.

The infrared spectrum of the composite material is represented in FIG. 4. The continuous normal-line curve corresponds to the final material, the dotted-line curve corresponds to the $TiO_2$+carbon mixture before amidation, and the bold-line curve corresponds to the differential curve. This figure shows that the band corresponding to the COOH group (L group) greatly decreased and that broad bands appeared in the 1620-1500 $cm^{-1}$ zone. These new bands are associated with the amide groups (stretching of the CO group, deformation of the NH group) which confirms the formation of amide bridging groups providing the molecular connection between the two molecules grafted to AM on the one hand and to EC on the other hand.

The invention claimed is:

1. A process for preparing a composite electrode having a mixture of particles of an active material AM and particles of an EC material generating an electronic conductivity, said mixture being supported by an electrical conductor forming a current collector CC, wherein said method comprises the steps of:

chemically modifying AM particles, EC particles and a current collector CC by reaction of said AM particles, EC particles and current collector CC with the T groups of T-X-L reactants and with the T groups of T-X-Q reactants, and reacting the chemically modified particles with one another and with the chemically modified current collector CC, in order to form covalent bonds, and electrostatic bonds, on the one hand between said particles and on the other hand between said particles and the current collector CC, and wherein the T groups are functional groups capable of reacting with the AM material, the EC material and the current collector CC in order to form covalent bonds;

the X groups are conjugated spacer groups, that is to say groups which comprise a system of atoms bonded by a covalent bond with at least one delocalized π bond;

some L groups are functional groups capable of reacting with another L functional groups in order to form covalent bonds on the one hand between the particles and on the other hand between the particles and the current collector CC;

some Q groups are charged groups capable of reacting with another Q charged groups in order to form electrostatic bonds on the one hand between the particles and on the other hand between the particles and the current collector CC, said Q charged groups may optionally be formed in situ; and the T and X groups of T-X-L reactants and T-X-Q reactants are identical or different.

2. The process as claimed in claim 1, wherein the active material is selected from the group consisting of oxides, phosphates and borates.

3. The process as claimed in claim 1, wherein the EC material generating an electronic conductivity is selected from the group consisting of a carbon black, a graphite, a carbon nanotube or carbon fiber, or a mixture thereof.

4. The process as claimed in claim 1, wherein the current collector CC is a metallic material selected from the group consisting of stainless steel, aluminum, copper, nickel, said metallic material optionally being modified by a layer of carbon, of transition metal nitride or of conductive polymer.

5. The process as claimed in claim 1, wherein the X spacer group is a divalent group having at least one group selected from the group consisting of phenylene, oligophenylene, oligophenylenevinylene, oligophenylenceethynylene, oligothiophene and azobenzene groups.

6. The process as claimed in claim 1, wherein the T group is:

a $PO_3H_2$, COOH or $SO_3H$ group and the substrate to be modified is an oxide, a phosphate or a borate; and a diazonium cation, when the substrate to be modified is carbon forming the EC material, or an active material AM in the form of particles that are at least partially coated with carbon, or a metallic material forming the current collector CC.

7. The process as claimed in claim 1, wherein one of the T-X-L reactants comprises an azido group as an L functional group and another T-X-L reactant comprises an acetylene group as an L functional group.

8. The process as claimed in claim 1, wherein one of the T-X-L reactants comprises an amine group as an L functional group and another T-X-L reactant comprises a COOH group as an L functional group.

9. The process as claimed in claim 1, wherein the Q group bears a negative chare or a positive charge.

10. The process as claimed in claim 9, wherein the Q group is a negatively-charged group selected from the group consisting of $COO^-$, $HPO_3^-$, $PO_3^{2-}$ and $SO_3^-$, or a positively-charged group $NH_3^+$.

11. The process as claimed in claim 1, wherein the reactant is selected from the group consisting of the compounds corresponding to the following formulae:

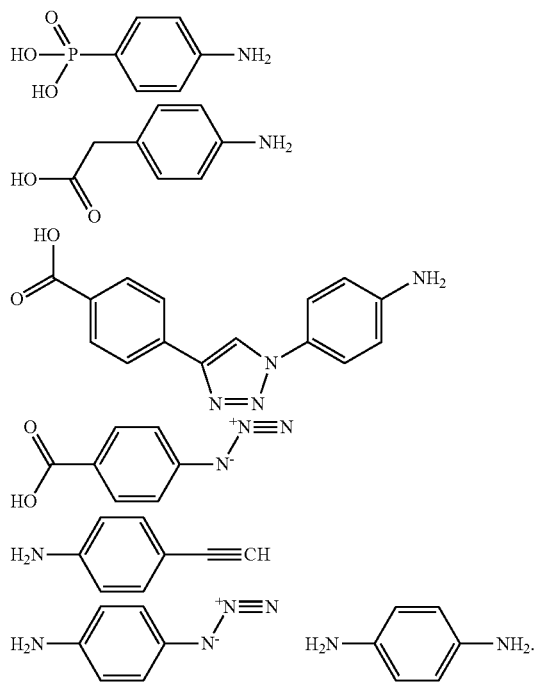

12. The process as claimed in claim 1, wherein said process further comprises the following steps:
a) modifying the AM particles using at least one T1-X1-L1 reactant and a T1'-X1'-Q1 reactant;
b) modifying the EC particles using at least one T2-X2-L2 reactant and a T2'-X2'-Q2 reactant, T2 being identical or different from T1, T2' being identical or different from T1', X2 being identical or different from X1, and X2' being identical or different from X1';
c) modifying the current collector CC using T3-X3-L3 and T3'-X3'-Q3 reactants, T3 being identical or different from T2 and T1, T3' being identical or different from T2' and T1', X3 being identical or different from X2 and X1, and X3' being identical or different from X2' and X1';
d) mixing the modified AM particles and the modified EC particles and bringing into contact with the modified current collector CC;
e) applying conditions that make the reaction between the various L groups possible;
it being understood that the L1, L2 and L3 groups are chosen so as to be able to react with one another.

13. The process as claimed in claim 12, wherein step e) is carried out in one or more steps, before or after bringing the mixture of modified AM particles and of modified EC particles into contact with the current collector CC.

14. The process as claimed in claim 13, wherein said process is carried out by introducing into a liquid support medium the current collector CC modified according to step c), the AM particles modified according to step a), the EC particles modified according to step b), then by applying the conditions required for the reaction between the various L1, L2 and L3 groups.

15. The process as claimed in claim 13, wherein a mixture of modified AM particles and of modified EC particles is prepared, a modified current collector CC is prepared, the mixture of modified particles is deposited on the modified current collector, then, as in the first procedure, the conditions required for the reaction between the various L1, L2 and L3 groups are applied.

16. The process as claimed in claim 14, wherein:
a modified current collector CC is prepared that bears L3 groups;
modified AM particles are prepared that bear an L1 group;
modified EC particles are prepared that bear L2 and L2' groups capable of reacting with one another and one of which can react with L1;
the modified particles are mixed and the conditions required for the reaction between the various L1, L2 and L2' groups are applied;
the material resulting from the reaction between the various L1, L2 and L2' groups is deposited on the modified current collector and the conditions that enable the reaction of the L3 groups with the L1, L2 and L2' groups that have remained free are applied.

* * * * *

UNITED STATES PATENT AND TRADEMARK OFFICE
CERTIFICATE OF CORRECTION

PATENT NO. : 9,263,728 B2  
APPLICATION NO. : 13/262948  
DATED : February 16, 2016  
INVENTOR(S) : Lestriez et al.

Page 1 of 1

It is certified that error appears in the above-identified patent and that said Letters Patent is hereby corrected as shown below:

In the Claims

Column 9, Claim 9, Line 8: The word "chare" between the words "negative" and "or" should read as "charge"

Signed and Sealed this  
Fourteenth Day of June, 2016

Michelle K. Lee  
*Director of the United States Patent and Trademark Office*